(12) United States Patent
Saka et al.

(10) Patent No.: US 10,632,826 B2
(45) Date of Patent: Apr. 28, 2020

(54) VEHICLE REAR STRUCTURE

(71) Applicant: MAZDA MOTOR CORPORATION, Hiroshima (JP)

(72) Inventors: Hirofumi Saka, Higashihiroshima (JP); Hiroki Ohira, Higashihiroshima (JP); Masanori Mochizuki, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 80 days.

(21) Appl. No.: 15/759,593

(22) PCT Filed: Oct. 20, 2016

(86) PCT No.: PCT/JP2016/081122
§ 371 (c)(1),
(2) Date: Mar. 13, 2018

(87) PCT Pub. No.: WO2017/073455
PCT Pub. Date: May 4, 2017

(65) Prior Publication Data
US 2019/0160927 A1 May 30, 2019

(30) Foreign Application Priority Data

Oct. 29, 2015 (JP) ................................ 2015-213073

(51) Int. Cl.
*B60J 7/22* (2006.01)
(52) U.S. Cl.
CPC .............. *B60J 7/223* (2013.01); *B60J 7/22* (2013.01)
(58) Field of Classification Search
CPC ... B60J 7/223; B60J 1/003; B60J 10/70; B60J 1/20; B60J 7/207; B60J 1/1823; B60J 1/183; B60J 7/148
(Continued)

(56) References Cited

U.S. PATENT DOCUMENTS

| 4,850,637 | A | * | 7/1989 | Carlino | ................... B60J 7/223 296/180.1 |
| 5,024,481 | A | * | 6/1991 | Swersky | ................. B60J 7/223 296/180.1 |

(Continued)

FOREIGN PATENT DOCUMENTS

| DE | 199 10 006 A1 | 9/2000 |
| DE | 199 10 060 A1 | 9/2000 |

(Continued)

OTHER PUBLICATIONS

International Search Report issued in PCT/JP2016/081122; dated Jan. 24, 2017.

*Primary Examiner* — D Glenn Dayoan
*Assistant Examiner* — Sunsurraye Westbrook
(74) *Attorney, Agent, or Firm* — Studebaker & Brackett PC

(57) ABSTRACT

A vehicle rear structure includes a rear roof having: a pair of side wall portions located on an outer side in a vehicle width direction with respect to a pair of seats, and extending rearward of the seats; and a rear window for closing a window opening formed between the paired side wall portions. An upward standing deflection plate is provided between the paired seats and on a rear side of the seats. The deflection plate integrally includes a pair of outer air receiving portions away from each other in the vehicle width direction, and a middle air receiving portion connecting the outer air receiving portions in the vehicle width direction, and is made of a material having transparency. A length of the middle air receiving portion in an up-down direction is set shorter than a length of the outer air receiving portion in the up-down direction.

4 Claims, 11 Drawing Sheets

(58) Field of Classification Search
USPC .......... 296/85, 180.1, 180.5, 86, 66, 64, 10,
296/107.15; 52/173.1, 204.597, 764,
52/717.02, 203; 135/249, 251, 257, 258,
135/291
See application file for complete search history.

(56) References Cited

U.S. PATENT DOCUMENTS

| | | | |
|---|---|---|---|
| 5,318,337 A * | 6/1994 | Gotz | B60J 7/223 |
| | | | 280/756 |
| 5,702,150 A | 12/1997 | Reuter et al. | |
| 6,322,130 B1 * | 11/2001 | Wanden | B60R 21/13 |
| | | | 280/756 |
| 6,582,009 B2 * | 6/2003 | Wezyk | B60J 1/183 |
| | | | 296/107.07 |
| 9,579,960 B1 * | 2/2017 | Noble | B60J 7/223 |
| 2004/0245804 A1 | 12/2004 | Schmitt et al. | |
| 2010/0193174 A1 | 8/2010 | Nemoto | |
| 2010/0289294 A1 | 11/2010 | Lehmann et al. | |

FOREIGN PATENT DOCUMENTS

| | | |
|---|---|---|
| DE | 10 2009 005 818 A1 | 12/2009 |
| EP | 2 246 211 A1 | 11/2010 |
| JP | H04-100731 A | 4/1992 |
| JP | H09-104303 A | 4/1997 |
| JP | H10-071859 A | 3/1998 |
| JP | H10-081140 A | 3/1998 |
| JP | 2006-224907 A | 8/2006 |
| JP | 2010-260534 A | 11/2010 |
| JP | 2011-500447 A | 1/2011 |
| WO | 2008/029837 A1 | 3/2008 |

\* cited by examiner

VEHICLE REAR STRUCTURE

TECHNICAL FIELD

The present invention relates to a rear structure of a vehicle including an openable rear window, for example, wherein the vehicle rear structure is provided with a deflection plate configured to deflect turbulent air flowing into a vehicle compartment from the rear side of a seat when the rear window is opened.

BACKGROUND ART

In a so-called convertible vehicle, i.e., a vehicle including an openable roof on a top portion of a vehicle compartment portion where a passenger is seated, traveling air from the vehicle front side flows rearward of the vehicle along a surface of a vehicle body in a state that the openable roof is closed (a closed state).

On the other hand, in a state (an opened state) that the openable roof is opened, traveling air is less likely to stably flow rearward due to an opening formed in the top portion of the vehicle. Further, the vehicle compartment becomes a negative pressure state, as compared with the outside of the vehicle. Therefore, a flow of traveling air flowing through the top portion of the vehicle is likely to change, as compared with a state that the openable roof is closed.

For example, it is known that in a state that an openable roof is opened, a part of traveling air flowing rearward of a seat over a front window changes its direction in such a manner that air is caused to flow back forward due to a negative pressure of a vehicle compartment (so-called turbulent air).

Further, after the direction of air is changed from rearward of the vehicle to forward of the vehicle, the turbulent air flowing into the vehicle compartment may impinge on the passenger from the rear side. Therefore, in a vehicle including an openable roof, a passenger may feel annoyed with wind due to turbulent air that impinges on the passenger or noise caused by the wind.

In view of the above, various techniques are proposed to avoid wind in a state that an openable roof is opened, or noise caused by the wind.

For example, in Patent Literature 1, there is provided a wind deflector device between a pair of left and right seats and on the vehicle rear side of the seats in order to deflect turbulent air flowing into a vehicle compartment from the rear side of the seats in a state that an openable roof is opened. Further, in Patent Literature 1, a plurality of hole portions are formed in a deflector plate (a deflection plate) of the wind deflector device.

In Patent Literature 1, rear visibility is secured by the plurality of hole portions formed in the deflector plate, and a flow rate of turbulent air flowing forward from the vehicle rear side is restricted by the deflector plate.

For example, when a holeless deflector plate of synthetic resin having transparency is used in order to secure enhanced rear visibility, in place of the aforementioned deflector plate having a plurality of holes, a large amount of turbulent air from the vehicle rear side may impinge on the deflector plate. This makes it possible to block turbulent air from flowing forward, and a large amount of turbulent air may flow outward in the vehicle width direction.

On the other hand, as disclosed in Patent Literature 1, in a convertible vehicle configured such that many of components constituting an upper portion of a vehicle compartment portion are accommodated in a vehicle body, turbulent air deflected outward in the vehicle width direction may join traveling air flowing rearward along a side portion of the vehicle. This makes it easy to allow turbulent air to flow outward of the vehicle.

However, there is a convertible vehicle configured such that a roof portion located above a passenger is opened and closed together with a rear window. In such a convertible vehicle, generally, even when a roof portion and a rear window are accommodated in a vehicle body, a side wall portion (e.g. a pillar member) constituting a rear part of a vehicle compartment portion is not accommodated in the vehicle body.

Therefore, turbulent air deflected outward in the vehicle width direction may further deflect forward along a side wall portion, and may impinge on the passenger through a gap between a seat and the side wall portion. Thus, in a convertible vehicle configured such that a side wall portion is not accommodated in a vehicle body, it is difficult to provide enhanced rear visibility, and comfort for the passenger.

CITATION LIST

Patent Literature

Patent Literature 1: Japanese Unexamined Patent Publication No. 2006-224907

SUMMARY OF INVENTION

In view of the aforementioned inconveniences, an object of the present invention is to provide a vehicle rear structure, which enables to provide enhanced rear visibility and comfort for the passenger.

In order to solve the aforementioned inconveniences, the present invention is directed to a rear structure of a vehicle provided with a pair of left and right seats on which passengers are seated, and a rear roof constituting an upper portion of a vehicle compartment on a rear side of the seats. The rear roof includes a pair of left and right side wall portions located on an outer side in a vehicle width direction with respect to the seats, and extending rearward of the seats; and an openable rear window for closing a window opening formed between the paired left and right side wall portions. The vehicle rear structure includes an upward standing deflection plate between the paired seats and on a rear side of the seats. The deflection plate integrally includes a pair of left and right outer air receiving portions away from each other in the vehicle width direction, and a middle air receiving portion connecting the outer air receiving portions in the vehicle width direction, and is made of a material having transparency. A length of the middle air receiving portion in an up-down direction is set shorter than a length of the outer air receiving portion in the up-down direction.

DESCRIPTION OF EMBODIMENTS

In the following, an embodiment of the present invention is described with reference to the drawings.

Figure 1:
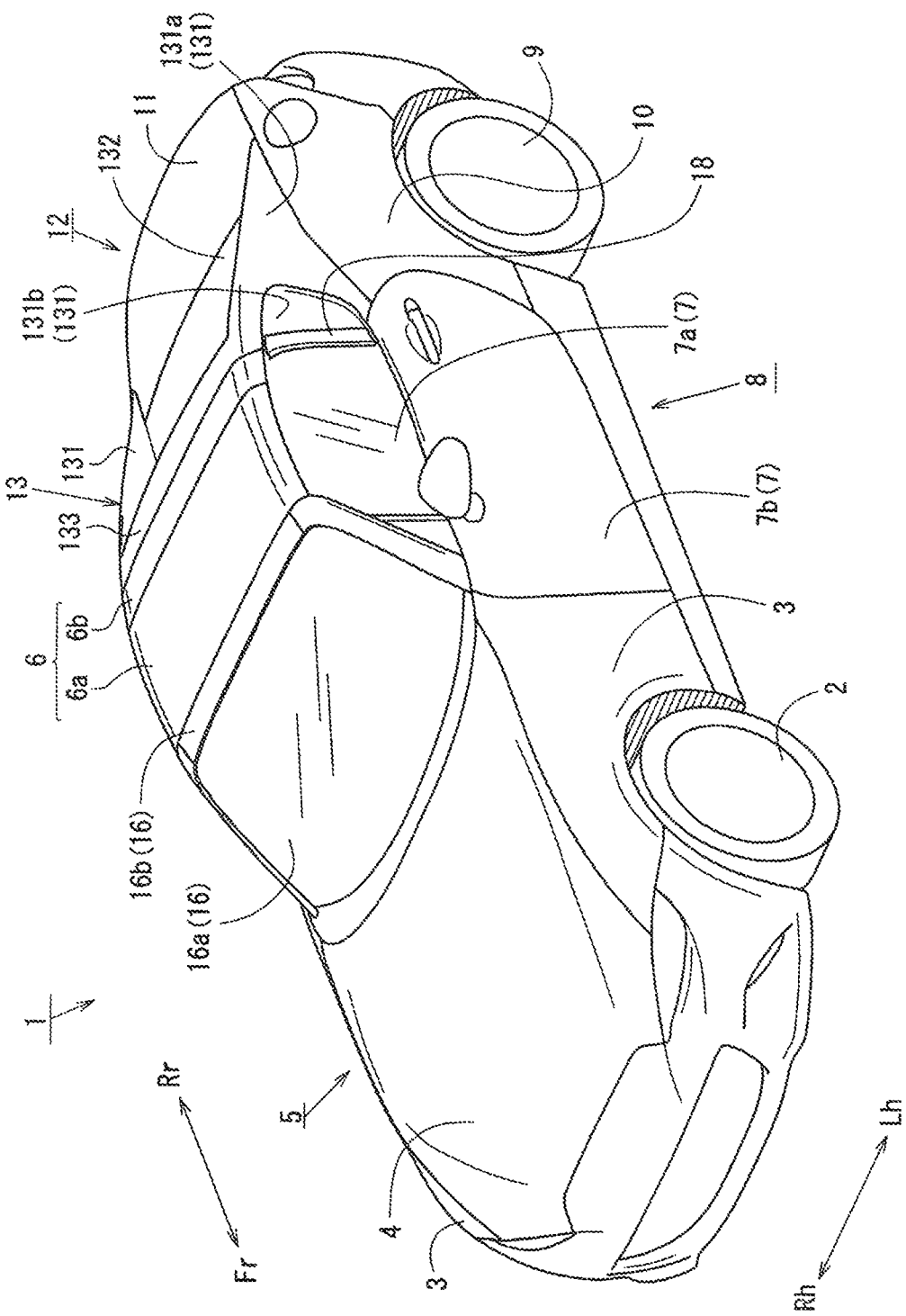
FIG. 1 is a perspective view illustrating an external appearance of a vehicle in a state that an openable roof is closed.
Figure 2:
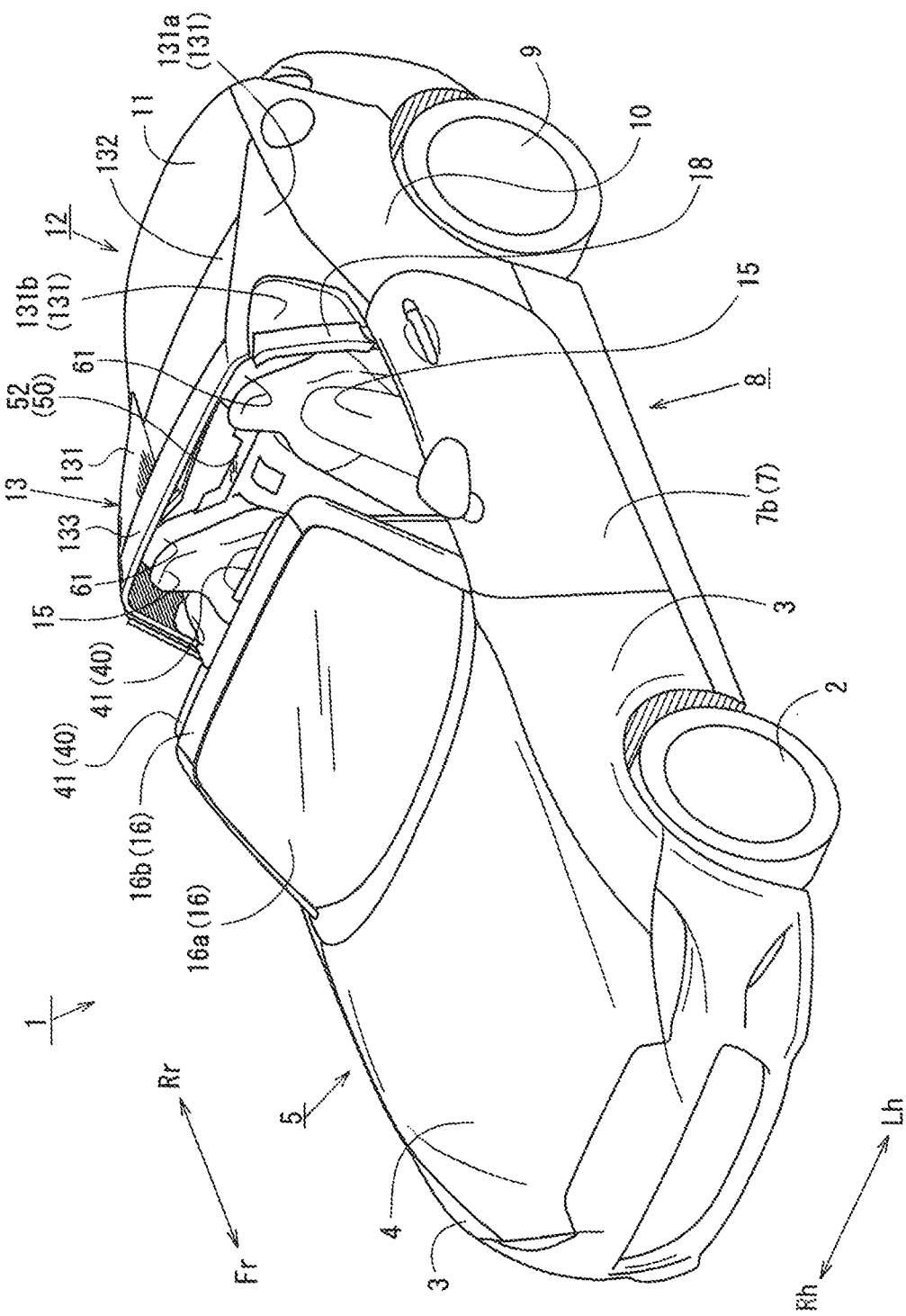
FIG. 2 is a perspective view illustrating an external appearance of the vehicle in a state that the openable roof is opened.
Figure 3:
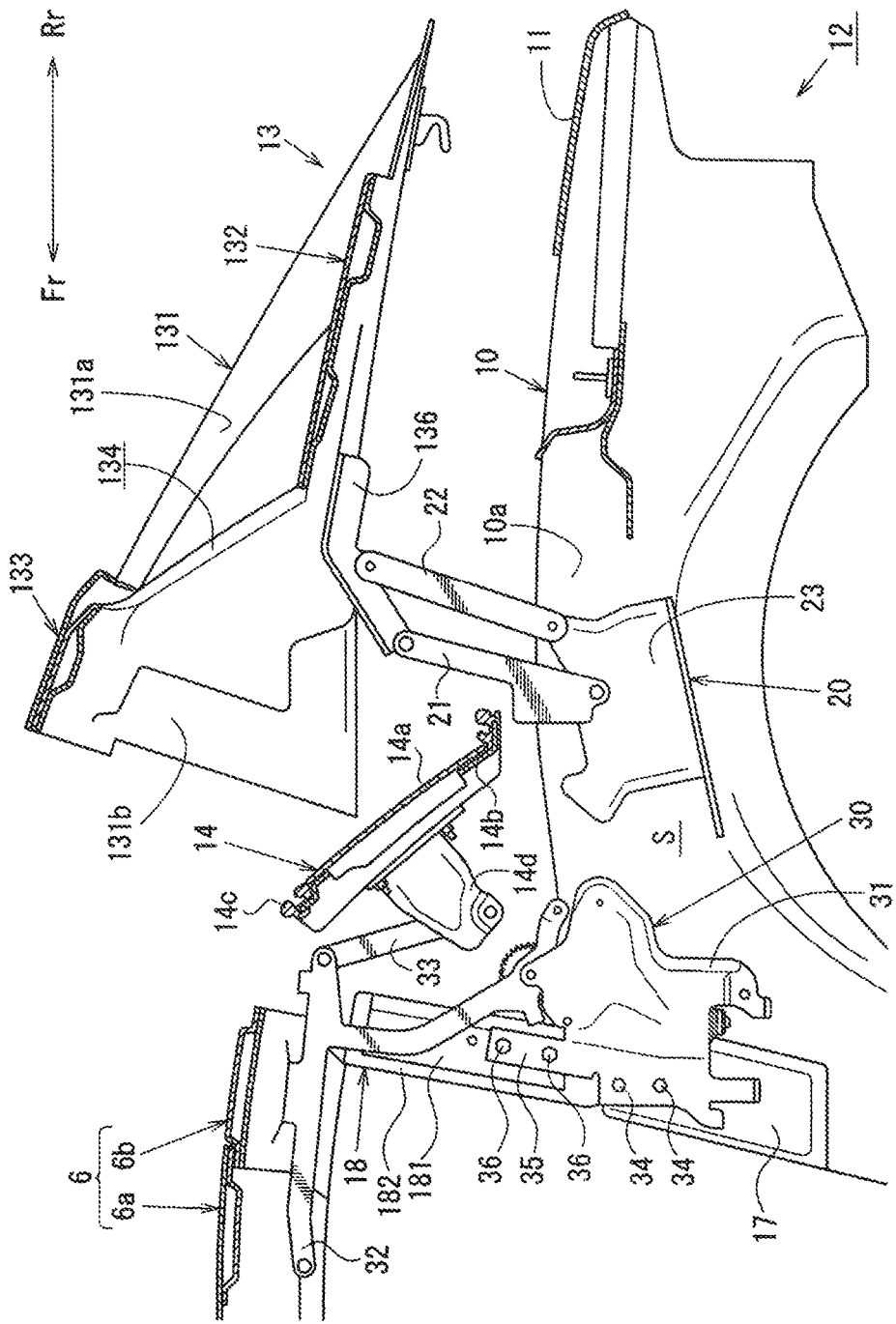
FIG. 3 is a side view of an open/close mechanism in a state that a deck cover is lifted when viewed from the inside of the vehicle.
Figure 4:
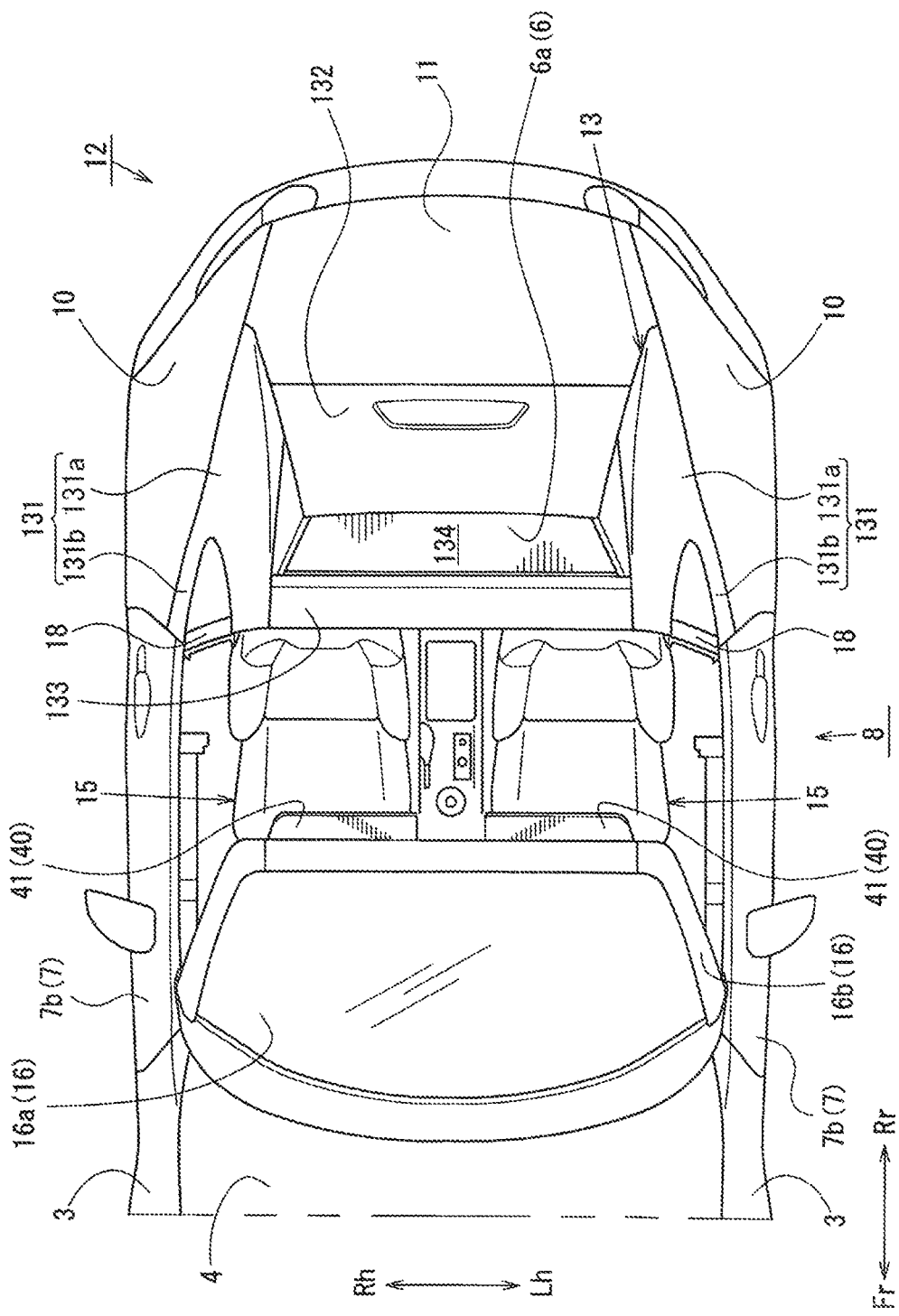
FIG. 4 is a plan view illustrating an external appearance of the vehicle in a state that the openable roof is opened.

A vehicle 1 in the embodiment is described in detail with reference to FIG. 1 to FIG. 9. FIG. 1 is a perspective view illustrating an external appearance of the vehicle 1 in a state that an openable roof 6 is closed. FIG. 2 is a perspective view illustrating an external appearance of the vehicle 1 in a state that the openable roof 6 is opened. FIG. 3 is a side view of an open/close mechanism in a state that a deck cover 13 is lifted when viewed from the inside of the vehicle. FIG. 4 is a plan view illustrating an external appearance of the vehicle 1 in a state that the openable roof 6 is opened.

Figure 5:
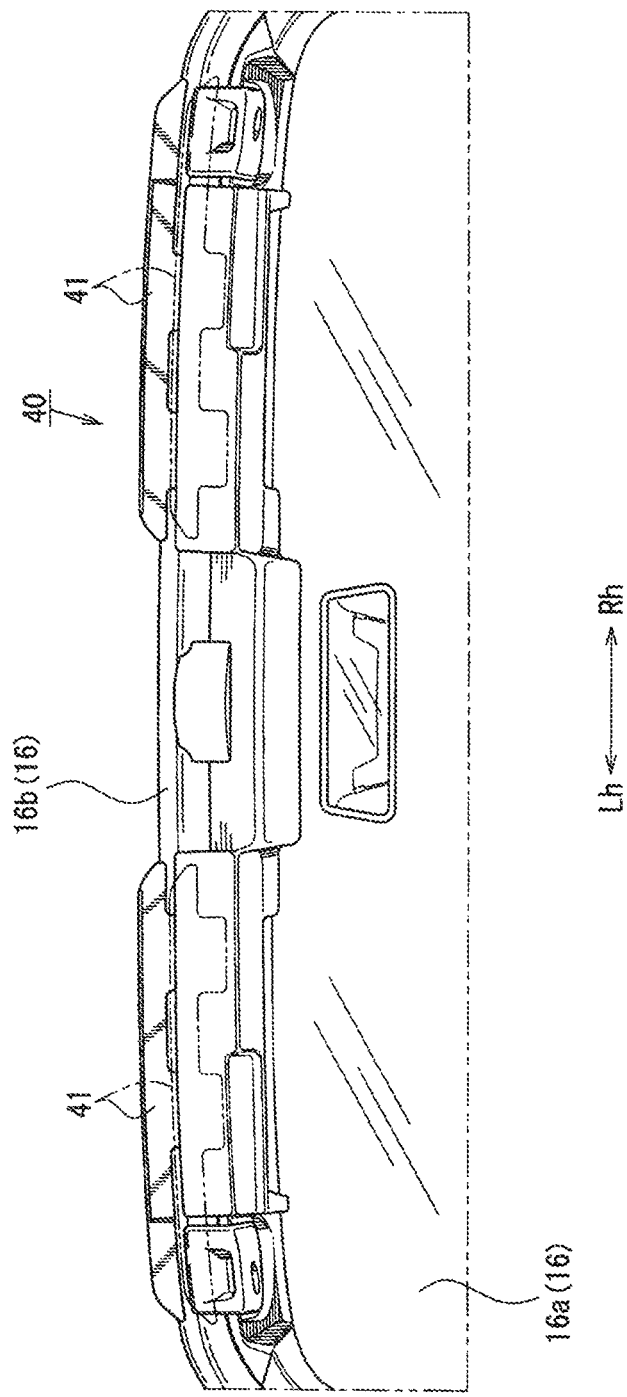
FIG. 5 is a rear view illustrating an external appearance of front deflector devices when viewed from the inside of a vehicle compartment.
Figure 6:
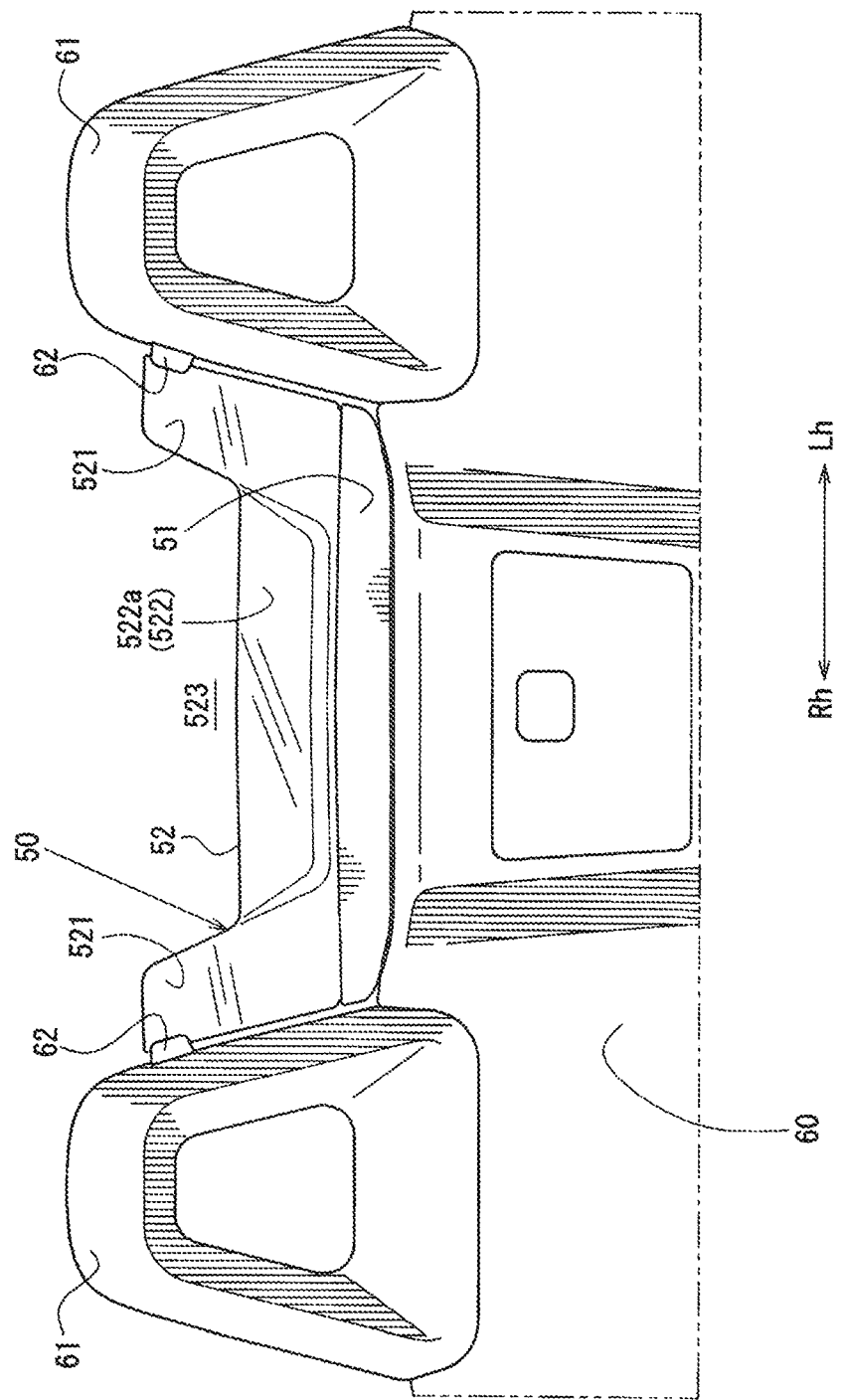
FIG. 6 is a front view illustrating an external appearance of a rear deflector when viewed from the inside of the vehicle compartment.
Figure 7:
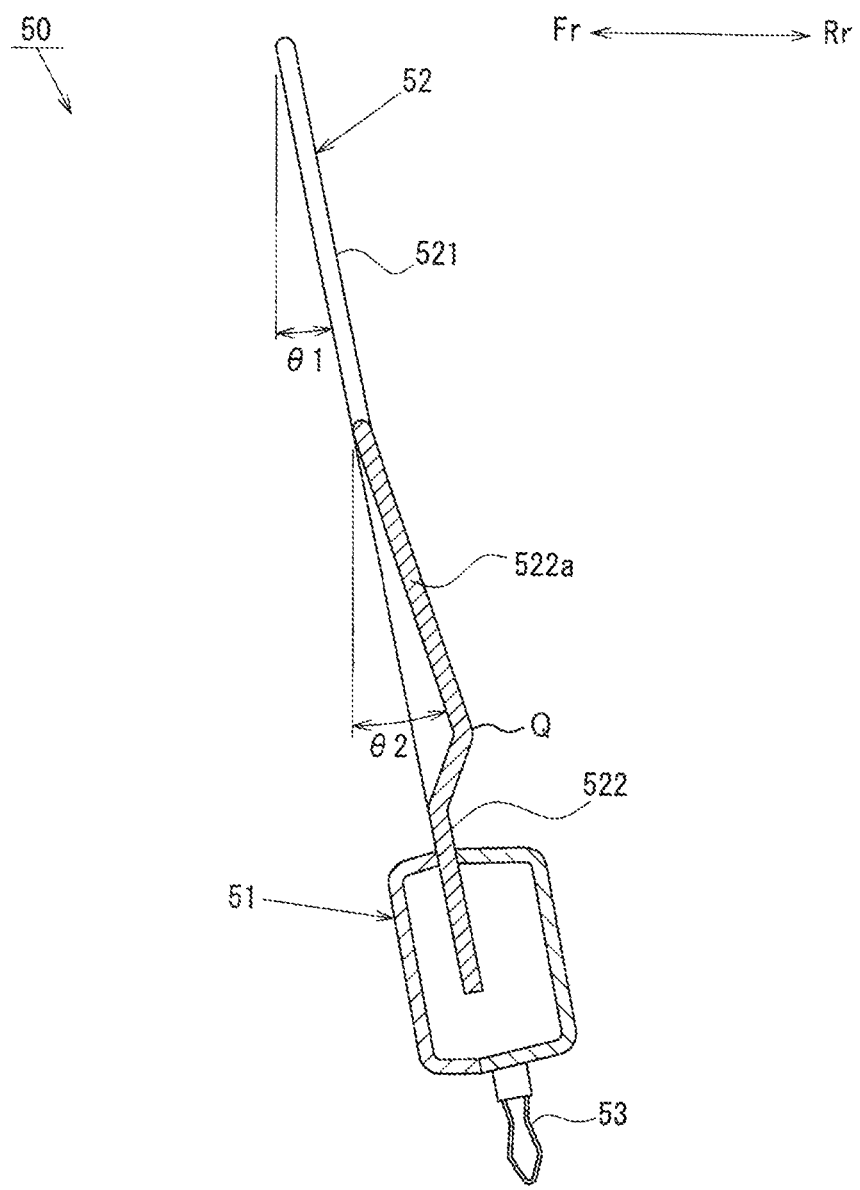
FIG. 7 is a cross-sectional view illustrating a cross section of the rear deflector taken along a front-rear direction of the vehicle.
Figure 8:
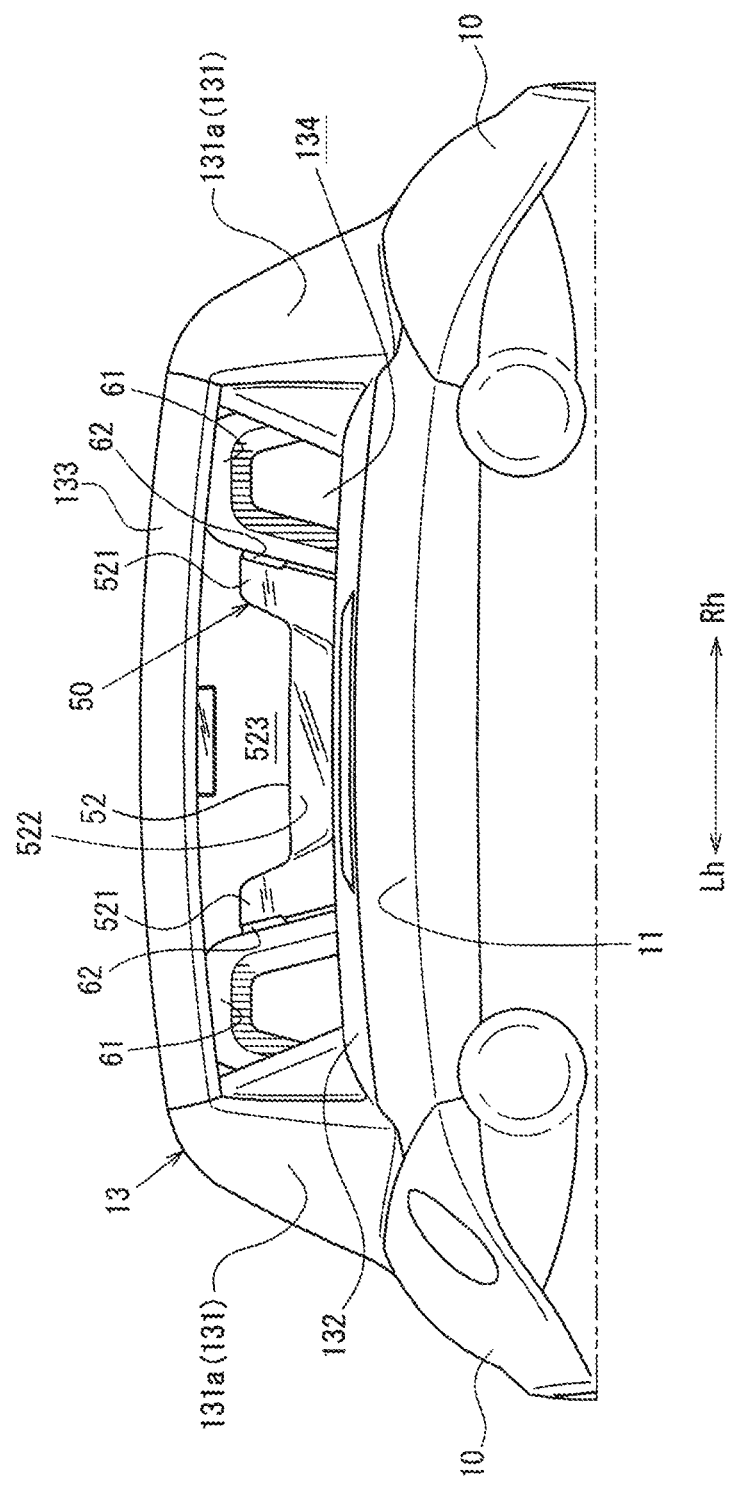
FIG. 8 is a rear view illustrating an external appearance of the rear deflector when viewed through a rear window opening.
Figure 9:
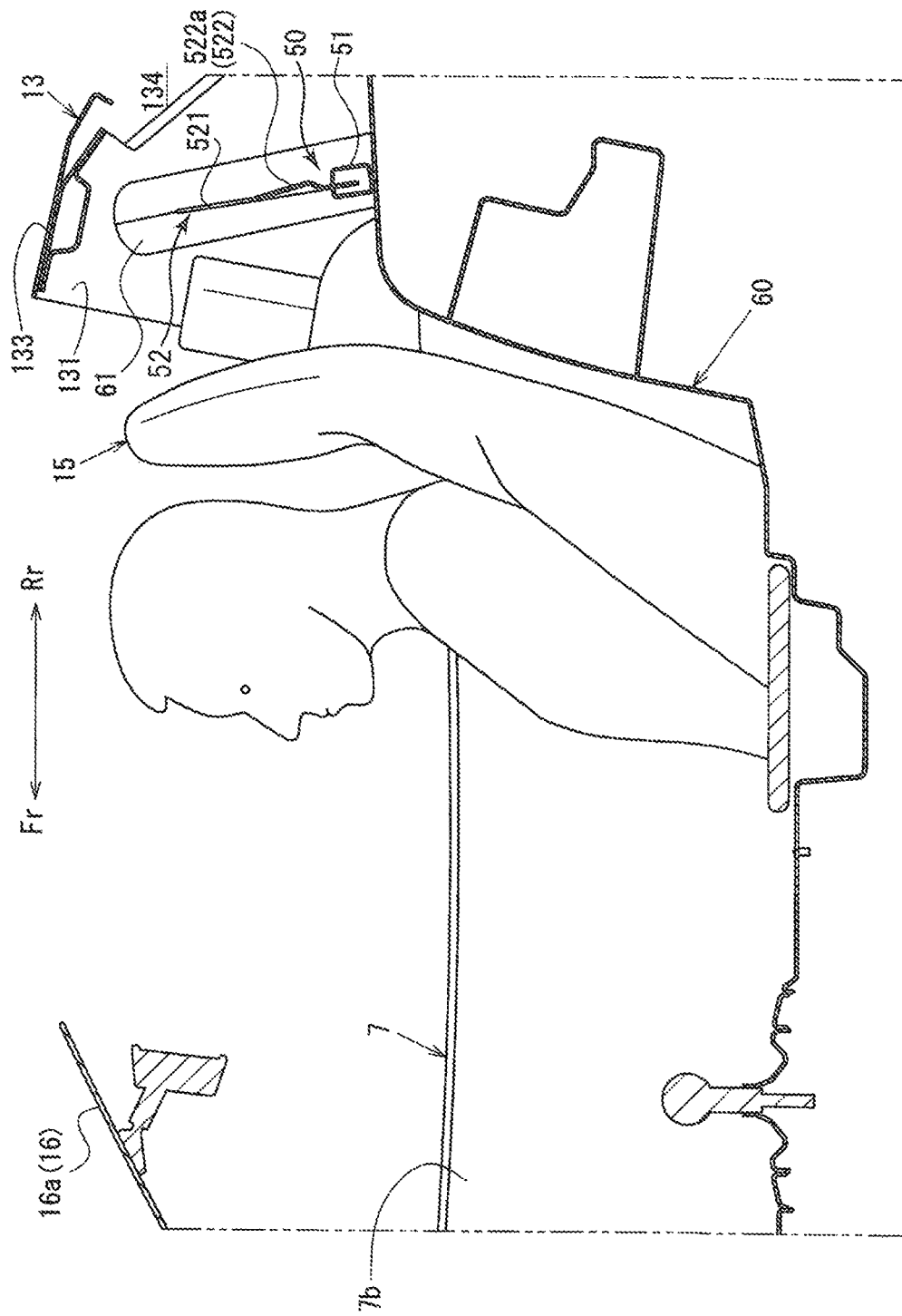
FIG. 9 is a cross-sectional view illustrating a relative position of the rear deflector with respect to a vehicle body.

FIG. 5 is a rear view illustrating an external appearance of front deflector devices 40 when viewed from the inside of a vehicle compartment. FIG. 6 is a front view illustrating an external appearance of a rear deflector 50 when viewed from the inside of the vehicle compartment. FIG. 7 is a cross-sectional view illustrating a cross section of the rear deflector 50 taken along the front-rear direction of the vehicle. FIG. 8 is a rear view illustrating an external appearance of the rear deflector 50 when viewed through a rear window opening 134. FIG. 9 is a cross-sectional view illustrating a relative position of the rear deflector 50 with respect to a vehicle body.

In the drawings, the arrow Fr indicates a front side of the vehicle 1, and the arrow Rr indicates a rear side of the vehicle 1. The arrow Lh indicates a left side of the vehicle 1, and the arrow Rh indicates a right side of the vehicle 1. Further, an upper side in FIG. 1 corresponds to an upper side of the vehicle 1, and a lower side in FIG. 1 corresponds to a lower side of the vehicle 1. Unless otherwise specifically mentioned, a front side, a rear side, a left side, a right side, an upper side and a lower side in the specification indicate the respective directions with respect to the vehicle 1 as described above.

As illustrated in FIG. 1, the vehicle 1 in the embodiment includes a vehicle front portion 5, a vehicle compartment portion 8, and a vehicle rear portion 12 from the front side to the rear side. The vehicle front portion 5 includes a pair of left and right front wheels 2, a pair of left and right front fenders 3, and a hood 4. The vehicle compartment portion 8 includes the openable roof 6 constituting an upper surface of the vehicle compartment portion 8, and a pair of left and right doors 7. The vehicle compartment portion 8 defines a vehicle compartment where a passenger is seated. The vehicle rear portion 12 includes a pair of left and right rear wheels 9, a pair of left and right rear fenders 10, and a trunk lid 11.

As illustrated in FIG. 2 and FIG. 3, an upward opened accommodation portion S is formed at a position close to the front side and between the paired left and right rear fenders 10. The vehicle rear portion 12 includes the deck cover 13 (corresponding to a "rear roof" in the claims) configured to close an opening of the accommodation portion S.

The vehicle 1 of the embodiment is a so-called convertible vehicle. Specifically, as illustrated in FIG. 1 to FIG. 3, the openable roof 6 is collapsibly folded and accommodated in the accommodation portion S in an opened state by moving the deck cover 13 upward and rearward, and a rear window 14 is accommodated in association with accommodation of the openable roof 6.

More specifically, the accommodation portion S is formed to have an inner space of a size capable of accommodating the openable roof 6 in a folded state, and the rear window 14.

As illustrated in FIG. 2 to FIG. 4, the deck cover 13 configured to cover an opening of the accommodation portion S is formed to define a rear portion of a vehicle compartment. More specifically, the deck cover 13 is formed to define a portion of a vehicle compartment located on the upper side of a door body 7b of the door 7, and located on the rear side of a rear end of a door glass 7a of the door 7.

The deck cover 13 includes a pair of left and right cover side portions 131 (corresponding to "side wall portions" in the claims) opposing to each other in the vehicle width direction, a cover base portion 132 configured to connect lower portions of the cover side portions 131, and a cover header portion 133 configured to connect upper portions of the cover side portions 131.

Further, the deck cover 13 includes the rear window opening 134 (corresponding to a "window opening" in the claims) surrounded by the paired left and right cover portions 131, the cover base portion 132, and the cover header portion 133. The rear window 14 is dismountably mounted in the rear window opening 134.

The paired left and right cover side portions 131 integrally include a pair of left and right bulging portions 131a (corresponding to "roof extension portions" in the claims) bulging upward from the paired left and right rear fenders 10, and a pair of left and right side wall portions 131b extending forward from the bulging portions 131a.

Each of the paired left and right bulging portions 131a is formed to extend from a position close to the rear side of a front end of the trunk lid 11 to a position on the front side of the front end, and to bulge upward and continuously from the rear fender 10. Each of the bulging portions 131a is formed into a substantially convex shape in a front view in such a manner that the width of a lower portion thereof is slightly larger than the width of an upper portion thereof in a front view.

Further, the paired left and right bulging portions 131a are formed in such a manner that a distance between rear portions of the paired left and right bulging portions 131a in the vehicle width direction is slightly wider than a distance between front portions thereof. Specifically, the deck cover 13 is formed into a shape that the distance between the paired left and right bulging portions 131a in the vehicle width direction is gradually decreased from a rear portion thereof to a front portion thereof (as it approaches the rear window opening 134). A front end of each of the paired left and right bulging portions 131a is inclined in such a manner that an upper end thereof is located on the rear side than a lower end thereof in a side view.

The side wall portion 131b is formed to extend forward from an outer wall portion of the bulging portion 131a in the vehicle width direction, and to reach a position proximal to the door glass 7a.

The cover base portion 132 is formed into a substantially flat plate shape of a size capable of covering a rear portion of the accommodation portion S, and is formed to connect lower ends of the bulging portions 131a in the vehicle width direction. Further, the cover base portion 132 is formed to have a flat surface substantially continuing to an upper surface of the trunk lid 11.

The cover header portion 133 connects upper ends of the side wall portions 131b in the vehicle width direction.

The rear window opening 134 is an opening surrounded by front ends of the bulging portions 131a of the paired left and right cover side portions 131, a front end of the cover base portion 132, and a rear end of the cover header portion 133. The rear window opening 134 is formed into an inverted trapezoidal shape in a rear view.

The deck cover 13 is supported on a vehicle body via a pair of left and right cover open/close mechanisms 20. The cover open/close mechanisms 20 are capable of implementing an operation of opening the accommodation portion S by moving the deck cover 13 upward, and an operation of closing the accommodation portion S by moving the deck cover 13 downward.

As illustrated in FIG. 3, the cover open/close mechanisms 20 include a pair of left and right front cover link members 21 and a pair of left and right rear cover link members 22 configured to support the deck cover 13, and a pair of left and right cover link drive portions 23 configured to pivotally move the front cover link members 21.

The front cover link member 21 is a member of a substantially strip shape in a side view and extending in the up-down direction. An upper end of the front cover link member 21 is pivotally supported to a front end of a cover bracket 136 provided at a lower portion of the deck cover 13.

The rear cover link member 22 is a member of a substantially strip shape in a side view and extending in the up-down direction on the rear side of the front cover link member 21. An upper end of the rear cover link member 22 is pivotally supported to the cover bracket 136 of the deck cover 13.

The cover link drive portion 23 is fixedly engaged with a fender inner panel 10a constituting an inner side wall of the rear fender 10.

Although the illustration is omitted, the cover link drive portion 23 includes a rotatably supported large diameter gear, a plurality of rotatably supported drive gears in engagement with the large diameter gear, a housing configured to accommodate and hold the gears, and an electric motor configured to drive and rotate the drive gears.

The large diameter gear of the cover link drive portion 23 is connected to a lower end of the front cover link member 21. Further, a lower end of the rear cover link member 22 is pivotally supported to a rear end of an upper portion of the cover link drive portion 23. Specifically, the cover open/close mechanism 20 is a four-link unit constituted by the front cover link members 21 as drive links, and the rear cover link members 22 as slave links.

As illustrated in FIG. 1 to FIG. 3, the openable roof 6 is formed to have a size capable of covering an upper portion of the vehicle compartment portion 8, more specifically, an area between an upper peripheral portion of the front window 16 (a front window frame member 16b to be described later), and the cover header portion 133 of the deck cover 13. The openable roof 6 includes a front roof 6a, and a rear roof 6b formed on the rear side of the front roof 6a. A front end of the front roof 6a is dismountably mounted to the upper peripheral portion of the front window 16, and a rear end of the rear roof 6b is movable toward and away from the cover header portion 133.

Further, as illustrated in FIG. 3, the rear window 14 includes a rear glass 14a having transparency, a rear window frame member 14b configured to support the rear glass 14a, and a window seal member 14c mounted along an outer peripheral edge of the rear window frame member 14b. Further, a pair of left and right brackets 14d to which roof open/close mechanisms 30 to be described later are connected are fixed to two positions on a front surface of the rear window frame member 14b in the vehicle width direction.

The openable roof 6 and the rear window 14 are supported to the vehicle body via the paired left and right roof open/close mechanisms 30. The roof open/close mechanisms 30 are capable of implementing an operation of accommodating the openable roof 6 and the rear window 14 in the accommodation portion S, and an operation of expanding the openable roof 6 and the rear window 14 in an accommodated state.

As illustrated in FIG. 3, the roof open/close mechanisms 30 include a plurality of roof link members configured to support the openable roof 6 and the rear window 14, and a pair of left and right roof link drive portions 31 configured to pivotally move the roof link members.

It is possible to adopt any structure for the roof link members, as far as it is possible to accommodate the openable roof 6 and the rear window 14 in the accommodation portion S. In the embodiment, the roof link members are configured as follows.

Specifically, the roof link members include a pair of left and right first roof links 32 configured to connect the rear roof 6b and the roof link drive portions 31, a pair of left and right second roof links 33 configured to connect rear ends of the first roof links 32 and the rear window 14, and a pair of left and right third roof links (not illustrated) configured to connect front ends of the first roof links 32 and the front roof 6a.

The first roof link 32 is a link member of a substantially T-shape in a side view. The first roof link 32 includes a portion to be fixedly engaged with an outer end of the rear roof 6b in the vehicle width direction, and extending in the front-rear direction, and a portion whose lower end is connected to the roof link drive portion 31 and extending in the up-down direction.

The second roof link 33 is a link member of a substantially strip shape in a side view. An upper end of the second roof link 33 is pivotally supported to a rear end of the first roof link 32, and a lower end thereof is pivotally supported to a bracket 14d of the rear window 14.

An end of the third roof link is pivotally supported to a front end of an upper portion of the first roof link 32, and the other end thereof is fixedly engaged with the front roof 6a.

The roof link drive portion 31 is fixedly engaged with an upper portion of a pillar inner panel 17 constituting an opening edge of the door 7 via fastening bolts 34 in the inside of the vehicle compartment portion 8.

Although the illustration is omitted, the roof link drive portion 31 includes a rotatably supported large diameter gear, a plurality of rotatably supported drive gears in engagement with the large diameter gear, and a housing configured to accommodate and hold the gears. The large diameter gear is connected to a lower end of the first roof link 32.

An electric motor (not illustrated) configured to drive and rotate the drive gears is disposed on the outside of the housing in the vehicle width direction. The electric motor is controlled in such a manner that the paired left and right roof link drive portions 31 are synchronously driven on the right side and the left side of the vehicle.

Further, as illustrated in FIG. 3, the roof link drive portion 31 includes a housing extension portion 35 formed by extending an upper end of a front portion of a housing upward. The housing extension portion 35 is fixedly engaged with a pillar member 18, which is interposed between the door glass 7*a* and the deck cover 13, via fastening bolts 36.

As illustrated in FIG. 1 and FIG. 3, the pillar member 18 is a column-shaped member extending in the up-down direction along a rear end of the door glass 7*a*, and is connected to the pillar inner panel 17 via the roof link drive portion 31.

As illustrated in FIG. 3, the pillar member 18 includes a pillar core member 181 to be fixedly engaged with the housing extension portion 35, and a pillar seal member 182 made of synthetic rubber and mounted on the pillar core member 181 to close a gap between the door glass 7*a* and the deck cover 13.

As illustrated in FIG. 3, two screw holes (not illustrated) engageable with the fastening bolts 36 configured to engage the housing extension portion 35 of the roof link drive portion 31 are formed in the pillar core member 181.

In the vehicle 1 provided with the cover open/close mechanisms 20 and the roof open/close mechanisms 30 having the aforementioned configuration, the deck cover 13 is moved in such a manner as to open the accommodation portion S, and the openable roof 6 and the rear window 14 are collapsibly folded in the aforementioned state, and are accommodated in the accommodation portion S.

Specifically, in response to an operation of an unillustrated operation switch configured to designate accommodation of the openable roof 6 and the rear window 14, the cover link drive portion 23 of the cover open/close mechanism 20 pivotally moves the front cover link member 21 rearward and upward. Further, following the pivotal movement of the front cover link member 21, the rear cover link member 22 is pivotally moved in the same direction as the front cover link member 21. Thus, the deck cover 13 is moved upward and rearward while maintaining a posture thereof that a lower surface of the deck cover 13 is aligned with a substantially horizontal direction to open the accommodation portion S.

After the deck cover 13 starts moving as described above, the roof link drive portion 31 of the roof open/close mechanism 30 pivotally moves the first roof link 32 rearward, and the second roof link 33 and the third roof link are pivotally moved in respective predetermined detections in association with the pivotal movement of the first roof link 32.

Accompanied by pivotal movement of the links as described above, the rear roof 6*b* is pivotally moved downward and forward by about 180 degrees, and is shifted to a posture that a lower surface of the rear roof 6*b* faces a lower surface of the front roof 6*a* in the up-down direction. Further, the rear window 14 is pivotally moved until a posture that a front surface of the rear window 14 faces upward, and is moved to the lower side of the rear roof 6*b* after pivotal movement (after being folded). The front roof 6*a*, the rear roof 6*b*, and the rear window 14 stacked one over another in this order from the upper side are moved further rearward and downward, and are accommodated in the accommodation portion S.

In this way, the roof open/close mechanisms 30 move the openable roof 6 and the rear window 14 into the accommodation portion S, while folding the openable roof 6 and the rear window 14.

As illustrated in FIG. 2, the vehicle 1 includes, as deflection means configured to deflect traveling air flowing from the vehicle front side in a state that the openable roof 6 and the rear window 14 are accommodated in the accommodation portion S, the paired left and right front deflector devices 40 disposed on an upper portion of the front window 16, and the rear deflector 50 disposed on the rear side of seats 15.

As illustrated in FIG. 4 and FIG. 5, the paired left and right front deflector devices 40 are mounted on an upper peripheral portion of the front window 16. Specifically, the front window 16 includes a front glass 16*a* having transparency, and the front window frame member 16*b* of a substantially gate shape (an inverted U-shape) in a front view and configured to support the front glass 16*a*. The paired left and right front deflector devices 40 are mounted on left and right two positions facing the seats 15 in the front-rear direction on an upper peripheral portion of the front window frame member 16*b*.

The front deflector device 40 includes a deflector body 41, and urging means (not illustrated) configured to urge the deflector body 41 in such a direction that the deflector body 41 is pivotally moved upward. As the openable roof 6 is moved away from the front window frame member 16*b*, the deflector body 41 is pivotally moved upward by the urging means, whereby the deflector body 41 is shifted from an accommodation position indicated by the two-dotted chain line to a projection position indicated by the solid line. The deflector body 41 that is shifted to the projection position is disposed to project upward with respect to the front window frame member 16*b*.

The deflector body 41 (the front deflector device 40) that is shifted to a projection position has a function of deflecting traveling air from the vehicle front side, and allowing the traveling air to flow rearward to a position on the rear side of the cover header portion 133 of the deck cover 13.

The rear deflector 50 has a function of deflecting traveling air (turbulent air) flowing into the vehicle compartment through the rear window opening 134 of the deck cover 13.

Specifically, as illustrated in FIG. 2, FIG. 6, and FIG. 9, the rear deflector 50 is disposed in a rear portion of the vehicle compartment located between the paired left and right seats 15 in a front view, and located on the rear side of the seats 15 in a side view. More specifically, a pair of left and right seatback bars 61 are integrally formed with a seatback trim member 60 configured to partition the accommodation portion S and the vehicle compartment on the rear side of the paired left and right seats 15. The rear deflector 50 is disposed on the rear side of headrest portions of the seats 15, and between the paired left and right seatback bars 61.

As illustrated in FIG. 6 and FIG. 9, the seatback bar 61 is formed in such a manner that the height of an upper end thereof is substantially equal to the height of an upper end of the seat 15. The seatback bar 61 is formed into a substantially trapezoidal shape in a front view, whose length of the lower side is longer than the length of the upper side. The seatback bar 61 is mounted in a forward inclined posture that an upper end thereof is located slightly on the front side than a lower end thereof in a side view.

The seatback bar 61 includes a body portion constituted of a metal pipe member or the like of a substantially inverted U-shape in a front view, and connected to a high rigid member (not illustrated) configured to connect the paired left and right rear fenders 10 in the vehicle width direction, and a garnish member (a cover member) configured to cover the body portion.

A garnish member of the seatback bar 61 is dividable in the front-rear direction. A parting line of the garnish member is inclined at a substantially same angle as the angle of forward inclination of the seatback bar 61 in a side view (see FIG. 9).

As illustrated in FIG. 6, the rear deflector 50 includes a rear deflector body 52 (corresponding to a "deflection plate" in the claims) of a substantially U-shape in a front view, a lower support portion 51 configured to support a lower portion of the rear deflector body 52, and a pair of left and right upper support portions 62 configured to support an upper portion of the rear deflector body 52. The rear deflector body 52 and the lower support portion 51 are formed to have a substantially same length in the vehicle width direction as the distance between the paired left and right seatback bars 61.

The lower support portion 51 is dismountably mounted to a portion of the seatback trim member 60 configured to cover an area between the paired left and right seatback bars 61.

The upper support portion 62 is formed on an upper portion of an inner peripheral portion of the seatback bar 61 in the vehicle width direction to project inward in the vehicle width direction. The upper support portion 62 is disposed in alignment with a parting line of a garnish member of the seatback bar 61, and includes a slit along the parting line.

As illustrated in FIG. 7, the lower support portion 51 is formed into a substantially box shape capable of supporting a lower portion of the rear deflector body 52. Two metal clips 53 engageable with engagement holes (not illustrated) formed in the seatback trim member 60 are mounted on a lower surface of the lower support portion 51 at positions away from each other by a predetermined distance in the vehicle width direction.

As illustrated in FIG. 6, the rear deflector body 52 is a colorless and transparent plate-shaped member made of acrylic resin. The rear deflector body 52 integrally includes a pair of left and right outer air receiving portions 521 disposed away from each other in the vehicle width direction, and a middle air receiving portion 522 connecting lower portions of the outer air receiving portions 521 in the vehicle width direction. Specifically, the middle air receiving portion 522 is connected to a lower area of each outer air receiving portion 521 with respect to a substantially middle position of each outer air receiving portion 521 in the up-down direction. In other words, the length of the middle air receiving portion 522 in the up-down direction is set shorter than the length of the outer air receiving portion 521 in the up-down direction. As illustrated in FIG. 7, the outer air receiving portions 521 and the middle air receiving portion 522 are formed to have substantially the same thickness.

The rear deflector body 52 having the aforementioned shape includes a flowing space 523 through which traveling air is allowed to flow between the paired left and right outer air receiving portions 521 and on the upper side of the middle air receiving portion 522.

As illustrated in FIG. 6 and FIG. 7, the outer air receiving portion 521 is formed to have a substantially parallelogram shape of a long length in the up-down direction in a front view. An outer lateral edge of the outer air receiving portion 521 in the vehicle width direction is inclined in such a manner that a lower end thereof is located on the inner side in the vehicle width direction than an upper end thereof in a front view.

Specifically, as illustrated in FIG. 6 and FIG. 8, the outer lateral edge of the outer air receiving portion 521 in the vehicle width direction is inclined in such a manner that a lower end thereof is located on the inner side than an upper end thereof in the vehicle width direction so as to align with an inner lateral edge of the seatback bar 61 in the vehicle width direction, and to align with left and right lateral edges of the rear window opening 134 in a rear view.

As illustrated in FIG. 7 and FIG. 9, the outer air receiving portion 521 is supported to the lower support portion 51 in a state that the outer air receiving portion 521 is inclined to align with a parting line of a garnish member of the seatback bar 61 in a side view. More specifically, the outer air receiving portion 521 is supported to the lower support portion 51 in a posture that the outer air receiving portion 521 intersects a vertical line at an angle $\theta 1$ of forward inclination at which a lower end thereof is located slightly on the rear side than an upper end thereof.

As illustrated in FIG. 6, the middle air receiving portion 522 is formed into a substantially rectangular shape with a long length in the vehicle width direction in a front view. More specifically, the middle air receiving portion 522 is formed into a substantially inverted trapezoidal shape in a front view, whose length of the lower side is shorter than the length of the upper side, to be in conformity with the shape of the outer air receiving portion 521 that an inner lateral edge thereof in the vehicle width direction is inclined in a front view. The length of the upper side and of the lower side of the middle air receiving portion 522 in the vehicle width direction is set longer than the length of those of the outer air receiving portion 521.

As illustrated in FIG. 6 and FIG. 7 (particularly, in FIG. 7), the middle air receiving portion 522 includes a recess portion 522a formed into a shallow V-shape, which is convex rearward in a cross-sectional view. The recess portion 522a is formed in such a manner that the amount of projection thereof increases as the recess portion 522a extends rearward from an upper end of the middle air receiving portion 522 toward downward. The amount of projection is maximum at a lower position (a position indicated by the symbol Q in FIG. 7) with respect to a middle position of the middle air receiving portion 522 in the up-down direction.

Thus, the middle air receiving portion 522, specifically, an upper area of the recess portion 522a with respect to the maximum projecting position Q is inclined forward in such a manner that the upper area intersects a vertical line at the angle $\theta 2$ of forward inclination, which is larger than the angle $\theta 1$ of forward inclination of the outer air receiving portion 521.

A flow of traveling air around the vehicle 1 provided with the rear deflector 50 having the aforementioned configuration, in other words, a flow of traveling air X flowing rearward of the vehicle from the front window 16 over the seat 15 is described with reference to FIG. 10 and FIG. 11.

Figure 10:
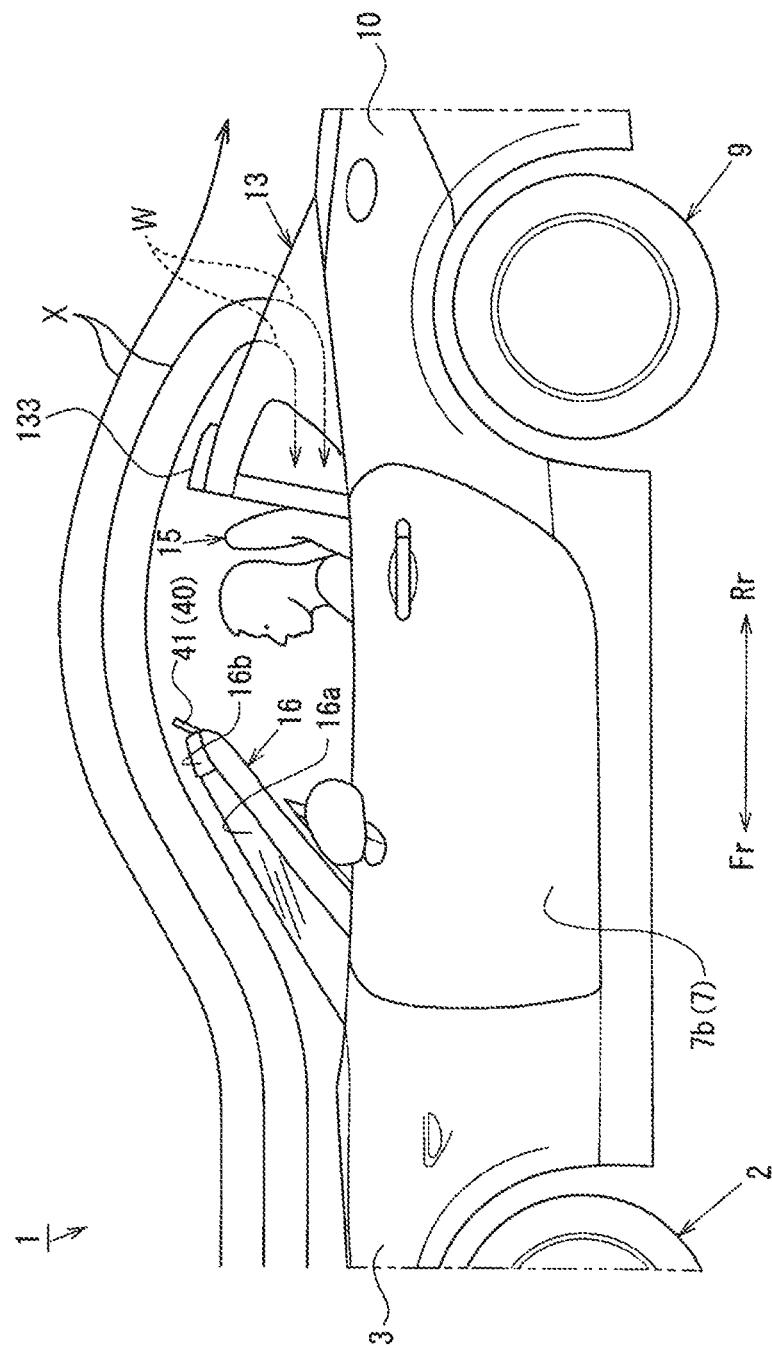
FIG. 10 is an explanatory diagram illustrating a flow of traveling air in a side view.
Figure 11:
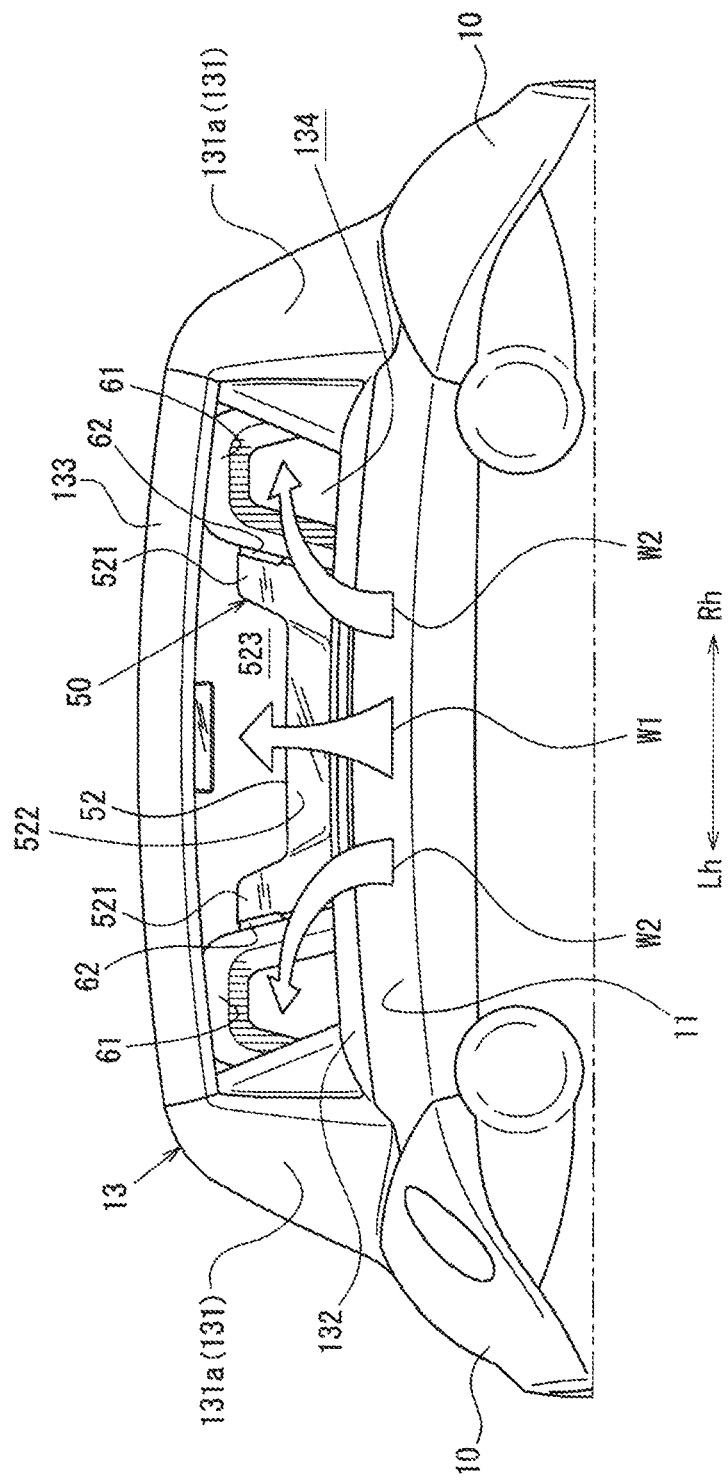
FIG. 11 is an explanatory diagram illustrating a flow of traveling air when viewed from the vehicle rear side.

FIG. 10 is a diagram illustrating a flow of traveling air X in a side view, and FIG. 11 is a diagram illustrating a flow of traveling air X when viewed from the vehicle rear side.

When the vehicle 1 travels in a state that the openable roof 6 and the rear window 14 are accommodated, as illustrated in FIG. 10, traveling air X from the vehicle front side flows rearward and upward along the front window 16, and reaches the front deflector device 40. The traveling air X that passes the front deflector device 40 flows further rearward while passing a position above the seat 15, and reaches the cover header portion 133 of the deck cover 13.

A part of the traveling air X that reaches the cover header portion 133 has its direction changed in such a manner that the air is caused to flow back forward from the vehicle rear side due to a negative pressure of the vehicle compartment, and flows into the vehicle compartment through the rear window opening 134. In the following, a part of traveling air whose direction is changed from the vehicle rear side toward the front side is referred to as turbulent air W (see FIG. 10).

As illustrated in FIG. 11, a part of turbulent air W that flows into the vehicle compartment through the rear window opening 134 flows further forward through the flowing space 523 formed between the paired left and right outer air receiving portions 521. On the other hand, turbulent air W that impinges on the rear deflector 50 has its direction changed by the outer air receiving portions 521, and flows outward in the vehicle width direction, for example.

In other words, turbulent air W flowing into the vehicle compartment through the rear window opening 134 is separated into turbulent air W1 flowing forward through the flowing space 532, and turbulent air W2 flowing outward in the vehicle width direction by the rear deflector 50.

As described above, in the rear structure of the vehicle 1 according to the embodiment, since the rear deflector body 52 for deflecting turbulent air W flowing from the vehicle rear side has transparency, it is possible to provide enhanced rear visibility and comfort for the passenger.

Specifically, since the rear deflector body 52 is made of synthetic resin having transparency, it is possible to suppress that rear visibility of the vehicle is impaired by the rear deflector body 52.

Thus, even when the rear deflector body 52 is present in the passenger's field of view when the passenger tries to directly or indirectly view the vehicle rear side (in other words, through a rear view mirror 70), it is possible to secure enhanced rear visibility.

Further, since the length of the middle air receiving portion 522 in the up-down direction is set shorter than the length of the outer air receiving portion 521 in the up-down direction, it is possible to use a space formed by the length difference, as the flowing space 523 for allowing a part of turbulent air W flowing from the vehicle rear side into the vehicle compartment to flow forward of the rear deflector body 52.

Thus, it is possible to allow a part of turbulent air W flowing from the vehicle rear side to flow forward of the rear deflector body 52 through the flowing space 523. Further, since the paired left and right outer air receiving portions 521 are formed on both sides of the flowing space 523, it is possible to deflect, by the outer air receiving portions 521, turbulent air W flowing from the vehicle rear side toward the vicinity of the passenger's head on the inner side in the vehicle width direction, particularly, turbulent air W flowing toward the passenger's ears, outward in the vehicle width direction.

In other words, in the embodiment, it is possible to separate turbulent air W flowing from the vehicle rear side into turbulent air W1 flowing forward through the flowing space 523, and turbulent air W2 flowing outward in the vehicle width direction.

Turbulent air W2 flowing outward in the vehicle width direction may flow forward through a gap between the seat 15 and the cover side portion 131. However, in the embodiment, since it is possible to allow turbulent air W1 to flow forward through the flowing space 523, it is possible to reduce a flow rate of turbulent air W2 flowing in a gap between the seat 15 and the cover side portion 131, and to suppress that the turbulent air W2 flows toward the vicinity of the passenger's head from the outer side in the vehicle width direction, particularly, flows toward the passenger's ears, as compared with a configuration, in which the flowing space 523 is not formed.

Therefore, it is possible to control wind from the outer side in the vehicle width direction with respect to the passenger's head, and wind from the inner side in the vehicle width direction with respect to the passenger's head, respectively (e.g. secure balance between an amount of wind from the outer side in the vehicle width direction, and an amount of wind from the inner side in the vehicle width direction), and to suppress noise generated by the respective winds.

Thus, in the embodiment, even when the cover side portion 131 of the deck cover 13 is not accommodated in the vehicle body, it is possible to provide enhanced rear visibility and comfort for the passenger.

Further, in the embodiment, a lower portion of the rear deflector body 52 is supported by the lower support portion 51 mounted on the seatback trim member 60, and an upper portion of each outer air receiving portion 521 of the rear deflector body 52 is supported by the upper support portion 62 mounted on the seatback bar 61. Therefore, it is possible to stably deflect turbulent air W flowing from the vehicle rear side, and to stably secure comfort for the passenger.

For example, when the rear deflector body 52 of a substantially U-shape in a front view is supported only by the lower support portion 51, an upper portion of each outer air receiving portion 521 is likely to sway by an air pressure of turbulent air W. As a result, the rear deflector body in a state that only a lower portion of the rear deflector body is supported may not stably deflect the turbulent air W.

On the other hand, in the embodiment, in which the upper support portion 62 supporting an upper portion of each outer air receiving portion 521 is provided, in addition to the lower support portion 51 supporting a lower portion of the rear deflector body 52, it is possible to enhance support rigidity of the rear deflector body 52, as compared with a configuration, in which the rear deflector body 52 is supported only by the lower support portion 51.

Thus, since it is possible to prevent that an upper portion of each outer air receiving portion 521 sways by an air pressure of turbulent air W, it is possible to stably deflect the turbulent air W, and to stably secure comfort for the passenger.

Further, in the embodiment, since the paired left and right bulging portions 131a of the deck cover 131 are formed in such a manner that a distance between rear portions of the paired left and right bulging portions 131a in the vehicle width direction is wider than a distance between front portions thereof, it is possible to stably secure comfort for the passenger, while enhancing design of the deck cover 13.

Specifically, when the distance between rear portions of the paired left and right bulging portions 131a in the vehicle width direction is wider than the distance between front portions thereof, it is easy to catch traveling air X flowing rearward of the rear window opening 134 by the bulging portions 131a.

Therefore, as compared with a configuration, in which the bulging portions 131a of the aforementioned shape are not formed, it is easy to draw traveling air X into the vehicle compartment through the rear window opening 134, and it is easy to increase a flow rate of turbulent air W flowing from the vehicle rear side into the vehicle compartment.

Thus, even when the structure of the deck cover 13, which is likely to generate turbulent air W, is employed, the structure of the embodiment provided with the aforementioned rear deflector body 52 makes it possible to allow the turbulent air W to flow forward, while deflecting the turbulent air W. This makes is possible to suppress wind, which may cause impingement of turbulent air W on the passenger's head, even when a flow rate of the turbulent air W increases.

Further, since the bulging portions 131*a* extending rearward of the rear window opening 134 are formed, it is possible to enhance design of the deck cover 13. Thus, in the embodiment, it is possible to provide the vehicle 1 with a sporty appearance, for example, while protecting the passenger from wind, and it is possible to enhance marketability of the vehicle 1.

As described above, in the embodiment, regardless that the structure of the deck cover 13, which is likely to generate turbulent air W, is employed in an effort to enhance design, it is possible to stably deflect the turbulent air W by the rear deflector body 52, and to stably secure comfort for the passenger.

In the foregoing, a preferred embodiment of the present invention is described. The present invention, however, is not limited to a configuration of the embodiment, and may be modified in various ways as far as the modifications do not depart from the gist of the present invention.

For example, in the embodiment, the rear deflector body 52 is made of colorless and transparent acrylic resin. As far as the material has transparency capable of transmitting light, a material of the rear deflector body (deflection plate) may be, for example, polycarbonate resin having transparency. Further, as far as the material is able to transmit light, the material may not be necessarily colorless.

Further, in the embodiment, the rear deflector body 52 has a substantially U-shape in a front view. As far as the rear deflector body (deflection plate) has a shape capable of defining a space corresponding to the flowing space 523, the rear deflector body may have a substantially inverted U-shape in a front view, or a substantially rectangular frame shape in a front view.

Further, in the embodiment, a lower portion of the rear deflector body 52 is supported by the lower support portion 51 mounted on the seatback trim member 60. As far as the lower support portion has a structure capable of supporting a lower portion of the rear deflector body (deflection plate), various replacements may be applicable. For example, a lower support portion projecting inward in the vehicle width direction may be mounted on a lower portion of the seatback bar 61, and a lower portion of the rear deflector body (deflection plate) may be supported by the lower support portion.

Summary of Embodiment

The following is a summary of the embodiment.

The embodiment relates to a rear structure of a vehicle provided with a pair of left and right seats on which passengers are seated, and a rear roof constituting an upper portion of a vehicle compartment on a rear side of the seats. The rear roof includes a pair of left and right side wall portions located on an outer side in a vehicle width direction with respect to the seats, and extending rearward of the seats; and an openable rear window for closing a window opening formed between the paired left and right side wall portions. An upward standing deflection plate is provided between the paired seats and on a rear side of the seats. The deflection plate integrally includes a pair of left and right outer air receiving portions away from each other in the vehicle width direction, and a middle air receiving portion connecting the outer air receiving portions in the vehicle width direction, and is made of a material having transparency. A length of the middle air receiving portion in an up-down direction is set shorter than a length of the outer air receiving portion in the up-down direction.

A material of the deflection plate having transparency may be a material capable of transmitting light, for example, transparent acrylic resin, transparent polycarbonate resin, transparent glass, and the like.

The deflection plate may have a substantially U-shape in a front view, a substantially inverted U-shape in a front view, or a substantially rectangular frame shape in a front view, for example.

Further, the length of the middle air receiving portion in the up-down direction, and the length of the outer air receiving portion in the up-down direction mean a length of a surface portion for receiving external air. Therefore, for example, when an opening is formed substantially in the middle of the middle air receiving portion (in other words, when a deflection plate is formed into a rectangular frame shape), the length of the middle air receiving portion in the up-down direction corresponds to a sum of a length from an upper end of the middle air receiving portion to an upper edge of the opening, and a length from a lower edge of the opening to a lower end of the middle air receiving portion.

In the aforementioned vehicle rear structure, it is possible to provide enhanced rear visibility, and comfort for the passenger.

Specifically, since the deflection plate is made of a material having transparency, it is possible to suppress that rear visibility of the vehicle is impaired by the deflection plate. Thus, for example, when a deflection plate is present within the passenger's field of view when the passenger tries to directly or indirectly view the vehicle rear side (e.g. through a rear view mirror), it is possible to secure enhanced rear visibility.

Further, since the length of the middle air receiving portion in the up-down direction is set shorter than the length of each of the paired left and right outer air receiving portions in the up-down direction, it is possible to use a space formed by the length difference, as a flowing space for allowing a part of turbulent air flowing from the vehicle rear side into the vehicle compartment to flow forward of the deflection plate.

For example, when a middle air receiving portion is formed in such a manner as to connect lower portions of a pair of left and right outer air receiving portions, in other words, when a deflection plate is formed into a substantially U-shape in a front view, it is easy to form a flowing space for allowing turbulent air to flow in an upper portion of a substantially middle of the deflection plate in the vehicle width direction, in other words, between the paired outer air receiving portions and on the upper side of the middle air receiving portion.

Thus, it is possible to allow a part of turbulent air flowing from the vehicle rear side to flow forward of the deflection plate through the flowing space. Further, since the paired left and right outer air receiving portions are formed on both sides of the flowing space, it is possible to deflect, by the outer air receiving portions, turbulent air flowing from the vehicle rear side toward the vicinity of the passenger's head on the inner side in the vehicle width direction, outward in the vehicle width direction.

In other words, in the vehicle rear structure, it is possible to separate turbulent air flowing from the vehicle rear side into turbulent air flowing forward through the flowing space, and turbulent air flowing outward in the vehicle width direction.

A part of turbulent air flowing outward in the vehicle width direction may flow forward through a gap between the seat and the side wall portion. In the vehicle rear structure, however, since it is possible to allow turbulent air to flow forward through the flowing space, it is possible to reduce a flow rate of turbulent air flowing through the gap between the seat and the side wall portion, and it is possible to suppress that turbulent air flows toward the vicinity of the passenger's head from the outer side in the vehicle width direction, as compared with a configuration, in which the flowing space is not formed.

Therefore, it is possible to control wind from the outer side in the vehicle width direction with respect to the passenger's head, and wind from the inner side in the vehicle width direction with respect to the passenger's head, respectively, and it is possible to suppress noise generated by the respective winds. Alternatively, it is possible to control such that an amount of wind from the outer side in the vehicle width direction is different from an amount of wind from the inner side in the vehicle width direction.

As described above, in the vehicle rear structure, even when a side wall portion of the rear roof is not accommodated in the vehicle body, it is possible to provide enhanced rear visibility, and comfort for the passenger.

Preferably, the vehicle rear structure may further include a lower support portion supporting a lower portion of the deflection plate; and an upper support portion supporting an upper portion of the outer air receiving portion of the deflection plate.

The lower support portion and the upper support portion are not limited to members directly supporting a lower portion and an upper portion of the deflection plate, and may be members indirectly supporting a lower portion and an upper portion of the deflection plate.

According to the aforementioned configuration, it is possible to stably deflect turbulent air, and to stably secure comfort for the passenger.

For example, when a deflection plate of a substantially U-shape in a front view is supported only by the lower support portion, an upper portion of the outer air receiving portion is likely to sway by an air pressure of turbulent air. Therefore, a deflection plate in a state that only a lower portion of the deflection plate is supported may not stably deflect turbulent air.

On the other hand, according to the aforementioned configuration, in which the upper support portion supporting an upper portion of the outer air receiving portion is formed, in addition to the lower support portion supporting a lower portion of the deflection plate, it is possible to enhance support rigidity of the deflection plate, as compared with a configuration, in which the deflection plate is supported only by the lower support portion.

Thus, since it is possible to prevent that an upper portion of the outer air receiving portion sways by an air pressure of turbulent air, it is possible to stably deflect the turbulent air, and to stably secure comfort for the passenger.

Preferably, the paired left and right side wall portions may include a pair of left and right roof extension portions extending rearward of the window opening to be closed by the rear window. The paired left and right roof extension portions may be formed in such a manner that a distance between rear portions of the paired left and right roof extension portions in the vehicle width direction is wider than a distance between front portions thereof.

According to the aforementioned configuration, it is possible to stably secure comfort for the passenger, while enhancing design of the rear roof.

Specifically, when the distance between rear portions of the paired left and right roof extension portions is wider than the distance between front portions thereof, it is easy to catch traveling air flowing rearward of the window opening by the roof extension portions.

Thus, as compared with a configuration, in which roof extension portions having the aforementioned shape are not provided, it is easy to draw traveling air through the widow opening into the vehicle compartment, and it is easy to increase a flow rate of turbulent air flowing from the vehicle rear side into the vehicle compartment.

Even when a structure of a rear roof, which is likely to generate turbulent air, is employed as described above, in the vehicle rear structure having the aforementioned deflection plate, it is possible to allow turbulent air to flow forward while deflecting the turbulent air. Thus, even when a flow rate of turbulent air is increased, it is possible to suppress wind, which may cause impingement of turbulent air on the passenger's head.

Further, since the roof extension portions extending rearward of the window opening are formed, it is possible to enhance design of the rear roof. Thus, according to the aforementioned configuration, it is possible to provide the vehicle with a sporty appearance, for example, while protecting the passenger from wind, and it is possible to enhance marketability of the vehicle.

As described above, according to the aforementioned configuration, regardless that the structure of the rear roof, which is likely to generate turbulent air, is employed in an effort to enhance design, it is possible to stably deflect turbulent air by the deflection plate, and to stably secure comfort for the passenger.

The invention claimed is:

1. A rear structure of a vehicle provided with a pair of left and right seats on which passengers are seated, and a rear roof constituting an upper portion of a vehicle compartment on a rear side of the seats, wherein
    the rear roof includes
        a pair of left and right side wall portions located on an outer side in a vehicle width direction with respect to the seats, and extending rearward of the seats, and
        an openable rear window for closing a window opening formed between the paired left and right side wall portions,
    the vehicle rear structure includes an upward standing deflection plate between the paired seats and on a rear side of the seats,
    the deflection plate integrally includes a pair of left and right outer air receiving portions away from each other in the vehicle width direction, and a middle air receiving portion connecting the outer air receiving portions in the vehicle width direction, and the deflection plate being made of a transparent material, and
    a length of the middle air receiving portion in an up-down direction is set shorter than a length of the outer air receiving portion in the up-down direction.

2. The vehicle rear structure according to claim 1, further comprising:
    a lower support portion supporting a lower portion of the deflection plate; and
    an upper support portion supporting an upper portion of the outer air receiving portion of the deflection plate.

3. The vehicle rear structure according to claim 1, wherein the paired left and right side wall portions include a pair of left and right roof extension portions extending rearward of the window opening to be closed by the rear window, and
the paired left and right roof extension portions are formed in such a manner that a distance between rear portions of the paired left and right roof extension portions in the vehicle width direction is wider than a distance between front portions thereof.

4. The vehicle rear structure according to claim 1, wherein a length in the vehicle width direction of the middle air receiving portion is longer than a length in the vehicle width direction of the first outer air receiving portion or a length in the vehicle width direction of the second outer air receiving portion.

* * * * *